Dec. 4, 1956 F. KESSLER 2,773,138

TELEPHONE LINE SELECTING SYSTEM

Filed Nov. 17, 1955 3 Sheets-Sheet 1

INVENTOR.
FRANK KESSLER

BY Francis E Blake

ATTORNEY

Dec. 4, 1956 F. KESSLER 2,773,138

TELEPHONE LINE SELECTING SYSTEM

Filed Nov. 17, 1955 3 Sheets-Sheet 2

Dec. 4, 1956 F. KESSLER 2,773,138

TELEPHONE LINE SELECTING SYSTEM

Filed Nov. 17, 1955 3 Sheets-Sheet 3

United States Patent Office 2,773,138

Patented Dec. 4, 1956

2,773,138

TELEPHONE LINE SELECTING SYSTEM

Frank Kessler, Los Angeles, Calif., assignor to General Dynamics Corporation, a Delaware corporation Application November 17, 1955, Serial No. 547,440

8 Claims. (Cl. 179—175.2)

This invention relates to telephone systems and more particularly to line selecting systems which may be especially useful for selecting and testing subscribers' lines in small dial type offices.

It is an important object of this invention to provide a simplified line selecting system in which groups of lines and a line in a group may be both selected by the operations of a line selecting device.

It is also an object of the present invention to provide a simplified line selecting system that is especially useful in a testing system for gaining access to and connecting with the subscriber lines in a remotely controlled dial office from a central testing location or position for test purposes.

Another object of the invention is to provide an improved testing system having a simplified arrangement to select a particular line group testing switch in a remote dial office, for thereafter selectively testing any of the lines available to such group test switch.

In the preferred embodiment of the invention, one of the group testing switches in a remote office is especially arranged to preliminarily respond to a first group of dial impulses connected thereto to thereafter select a particular one of any of the testing group switches including itself in the remote office for subsequent response to dialed digital impulses for selecting a particular line to be tested in the group.

Figure 1:
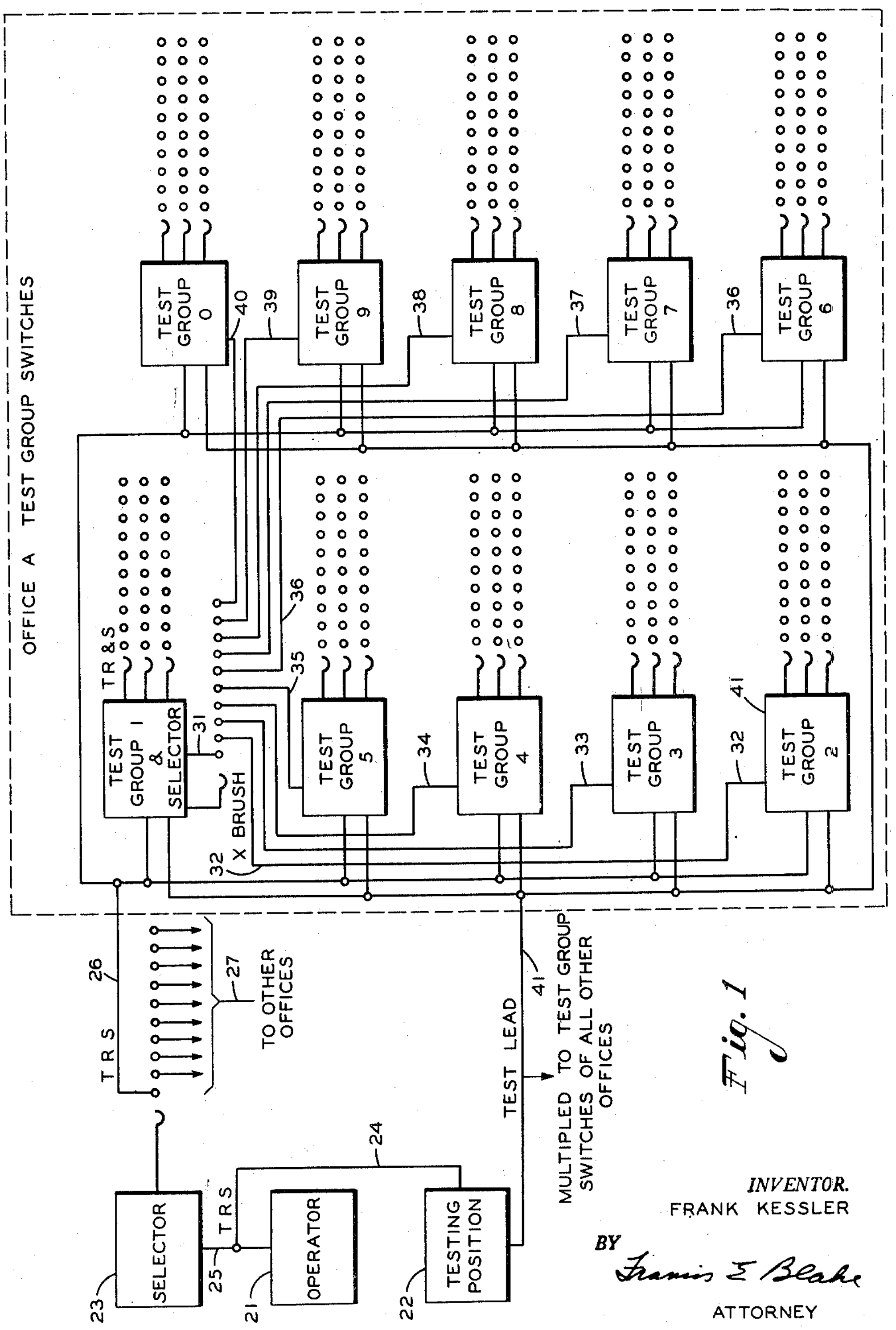
Figure 2:
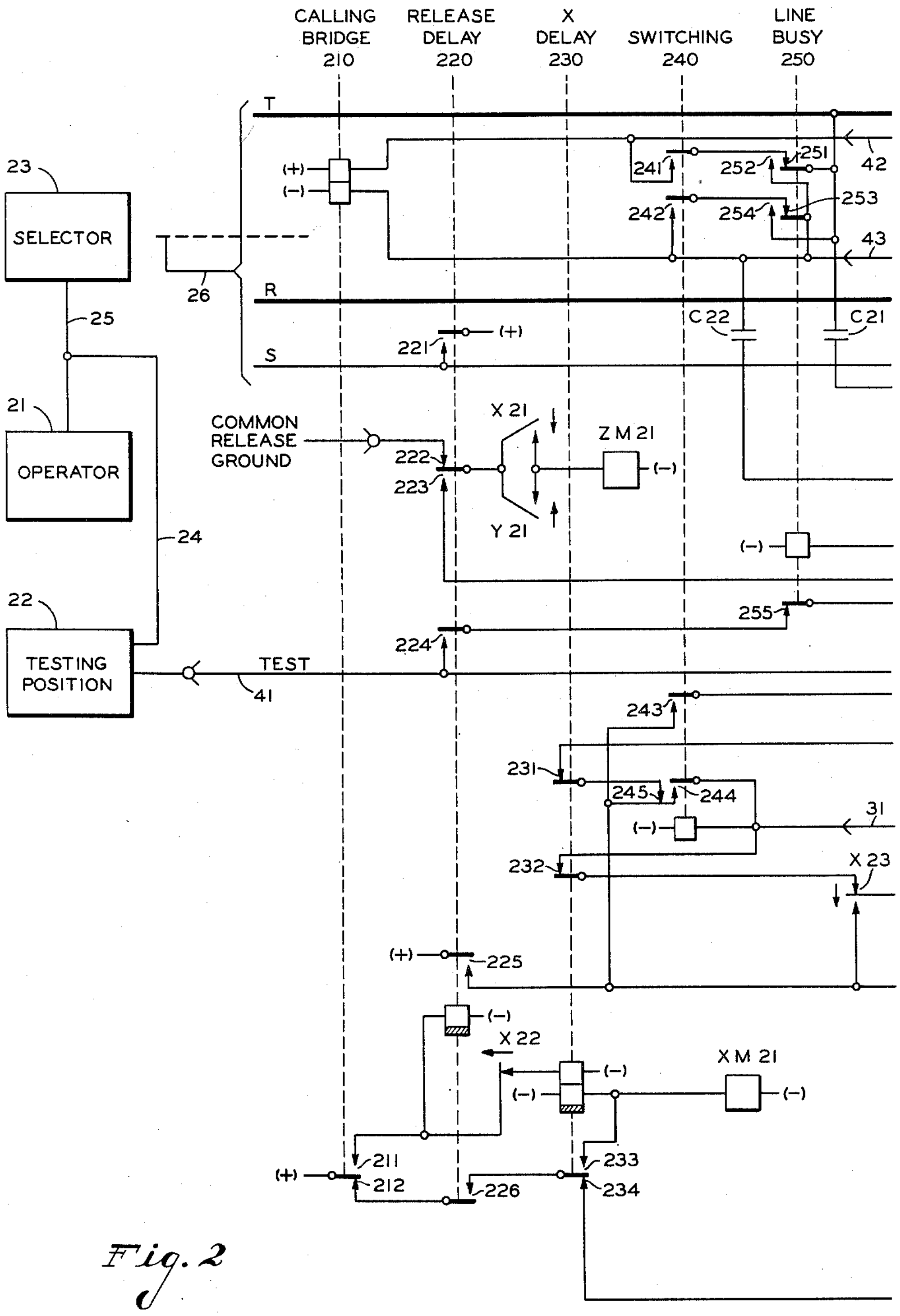
Figure 3:
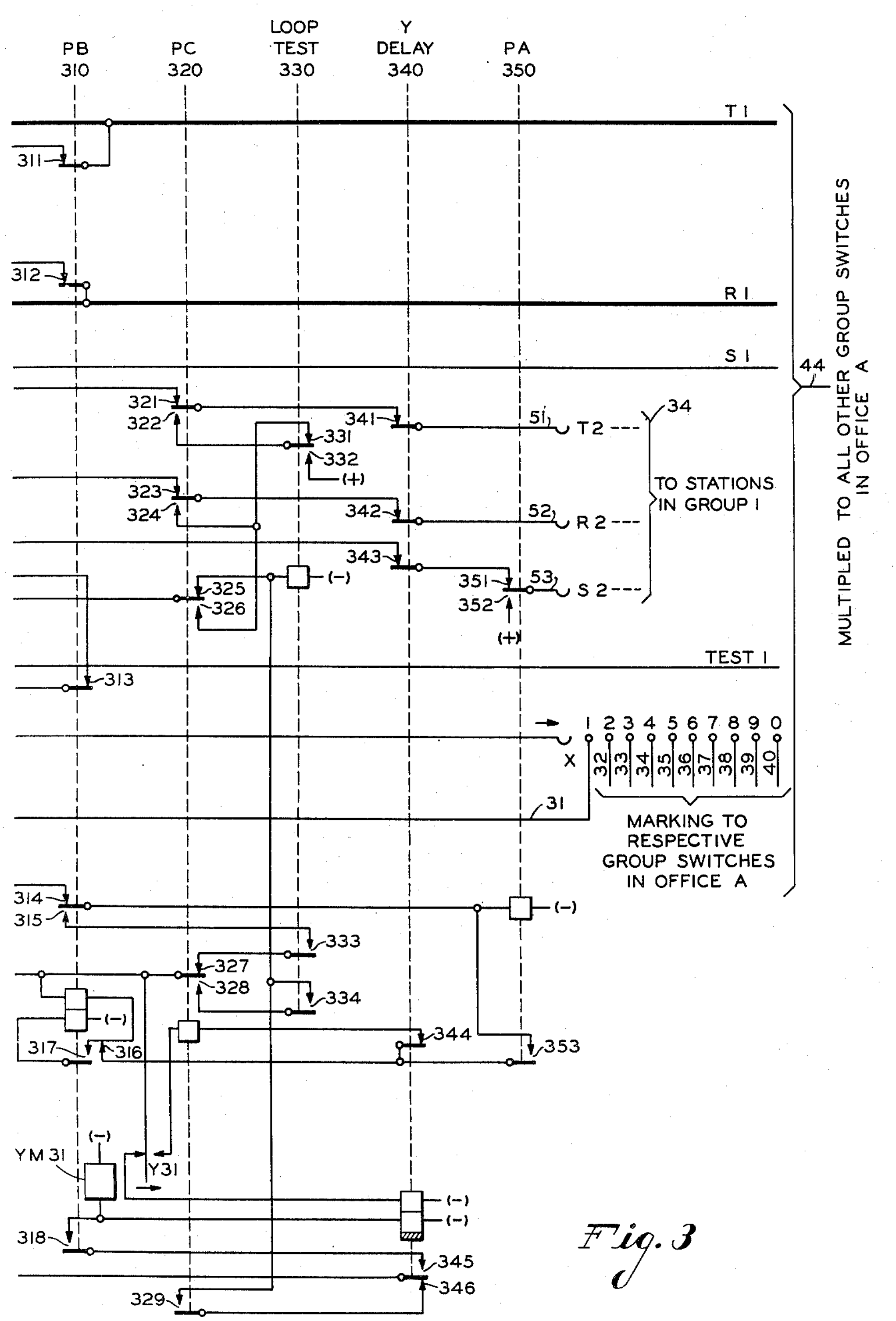

Further objects and the attending features of the invention will be apparent with reference to the following specification and drawings in which:

Fig. 1 is a block diagram to show the general arrangement of the testing system of the invention, Fig. 2 is a detailed schematic wiring diagram of a portion of the group 1 testing and selector switch circuit, and Fig. 3 is a detailed schematic wiring diagram of the remaining portion of the group 1 testing and selector switch circuit with the leads extending to the right of Fig. 1 arranged to connect with the leads extending to the left of Fig. 3.

For a preliminary general understanding of the testing system of the invention, reference will be made of Fig. 1 of the drawings. Either the test operator 21 or the testing position 22 may have access to the office selector switch and circuit 23 over the conventional tip, ring and sleeve leads, generally indicated at 24 and 25. The office selector 23 is operated in the useual manner in response to a first series of digit impulses to select a predetermined one of the outgoing tip, ring and sleeve conductors, such as 26 or 27. The tip, ring and sleeve conductors 26 extend to the group test switches of Office A where they are connected in multiple to all of the group 1–0 test connector switches in Office A. Each of the other selector terminals, generally indicated at 27, may extend to respective ones of other remote dial offices and are also respectively connected in multiple to all of the group test switches in each office. The testing position 22 also is connected by a test lead in multiple to all of the group test switches in any of the remotely located offices, such as Office A, and is used to complete the testing of a desired subscriber line as will be later referred to in greater detail.

The operation of the office selector switch 23 in response to the impulse of the digit "1," for example, will select the tip, ring and sleeve conductors 26 thereby connecting the testing position to all of the group testing connector switches of Office A. Any particular one of the group test connector switches in the group 1–0, is especially arranged, as will be later described in detail, to be the only one to respond to the next digit impulses and in the block diagram of Fig. 1 the group 1 test switch is designated as the one that is arranged to respond to the next digit impulses. It should be pointed out at this time that each of the group test connector switches for group 1–0 may be a conventional step-by-step switch having the usual tip, ring and sleeve brushes movable in first and second directions for selecting a particular set of terminals in its group of lines, and also having an X switch brush to be operated in a first direction only and select one of a group of terminals in response to the number of the first digit impulses connected thereto. As previously mentioned, for purposes of this description, only the group 1 test connector switch of Office A is connected by optional wiring 42, 43 (Figs. 2 and 3) to the tip, ring and sleeve conductors 26 to respond to the first digit impulses applied over such conductors 26, and therefore the X brush of such group 1 switch only will be advanced at that time to connect with a particular one of the X brush terminals thereby selecting one of the leads 31—40 depending upon the number of digit impulses in such first digit. The selection of a particular one of the test selector leads 31—40 in Office A thereafter conditions a selected one of the group 1–0 test switches to respond to the remaining two series of digital impulses for thereafter connecting with a particular subscriber's line to be tested in Office A. Thereafter, tests of the selected subscriber's line are made from the testing position 22 over the test lead 41. The test lead 41 extends in multiple to all of the group 1–0 switches in Office A and also to the other group switches in the other offices that may be avarilable for test by the selective operation of the office selector switch 23.

Referring now in detail to Figs. 2 and 3 of the drawings which show the circuit details of any one of the group 1–0 test connector switches in Office A as well as the optional jumper connections 42 and 43 which are connected only to the group 1 test switch in Office A, to initiate a call the operator 21 or a test operator at testing position 22 connects a loop circuit across the tip and ring conductors 24 or 25 to energize the office selector 23. Operator 21 or testing position 22 then causes the office selector 23 to step to a desired level by momentarily interrupting the loop circuit so that leads 26 are finally seized, all in a manner well known in the art and not described in further detail at this time.

The loop circuit thereafter closed across the incoming T and R conductors 26 operates the calling bridge relay 210 of the group 1 and test connector switch only, from the positive grounded battery pole indicated by the symbol (+) and hereafter referred to as ground, through the upper winding of calling bridge relay 210, optional wiring 42, normally closed contacts 311, said loop circuit, normally closed contacts 312, optional wiring 43, and through the lower winding of the calling bridge relay 210 to the negative ungrounded station battery pole indicated by the symbol (−) and hereafter referred to as battery.

As previously stated, the optional jumper connections 42 and 43, shown connected on the group 1 test connector switch, may be used on any one of the other group switches 2–0 in a particular exchange thereby designating such other group switch as the group test connector and selector switch. It should now be apparent that the optional jumper wiring 42 and 43 permits the use of the chosen group 1 switch as a means for thereafter selecting any one of the group 1–0 switches to be further operated to select the particular line to be tested. The tip, ring and sleeve conductors shown in Figs. 2 and 3 are therefore multipled by the connections shown generally at 44 to all other group test connector switches in the Office A. It will also be noted that the test lead 41 is connected in multiple by the designation generally shown at 44 to all other group test connector switches in Office A.

Operation of calling bridge relay 210 energizes release delay relay 220 from ground through operated contacts 211, and through the winding of release delay relay 220 to battery. Said relay 220 has a slow release characteristic which causes it to remain operated during the subsequent momentary pulsing action of calling bridge relay 210. Operation of release delay relay 220 connects ground through operated contacts 221 to the incoming conductor S to guard against intrusion by other succeeding calls. Operation of the calling bridge relay 210 also energizes X delay relay 230 from ground through operated contacts 211, normally closed X off-normal contacts X22, and through the upper winding of X delay relay 230 to battery. Operation of release delay relay 220 also closes contacts 224 so that the loop test relay 330 may be operated subsequently. Operation of release delay relay 220 also energizes Y delay relay 340 from ground through operated contacts 225, Y off-normal contacts Y31, and through the upper winding of Y delay relay 340 to battery.

The operator 21 or testing position 22 is now connected to the test group 1 connector switch used optionally in Office A as a means for thereafter selecting any desired one of the group test connector switches. Operator 21 or testing position 22 proceeds to connect with a required subscriber line which may, for example, be line 134. The calling bridge relay 210 responds correspondingly as the loop is momentarily opened once in dialing the digit "1," all in a manner well known in the art. As calling bridge relay 210 restores each time, release delay relay 220 has its holding ground opened at contacts 211 but does not restore due to its slow release characteristic. Relay 210 restoring also momentarily connects ground, at each restoration, through contacts 212, and operated contacts 226 and 233, to hold slow release X delay relay 230 and to operate the switch X magnet XM21, correspondingly. As the subject test switch steps in the X direction, X off-normal contacts X22 open to remove holding ground from the upper winding X delay relay 230 which remains operated, due to its slow release characteristic, until the above momentary ground pulses cease.

When the X delay relay 230 restores at the end of the first digit impulses, switching relay 240 operates from ground through operated contacts 225, normally closed contacts 245 and 231, X brush now resting on X brush terminal contact 1, through optional wiring 31, and through the winding of switching relay 240 to battery. Said relay 240 locks itself, through operated contacts 244, to ground through operated contacts 225. It will be recalled that the group test connector switch for group 1 is provided with an X brush and ten terminals for operation in one direction only in response to the first digit impulses connected thereto.

Operation of the switching relay 240 also connects ground through operated contacts 225 and 243, normally closed contacts 313, operated contacts 223 and X off-normal contacts X21, and through release magnet ZM21 to battery, to restore the subject test connector switch. X off-normal contacts X22 and X23 are now again closed to reoperate X delay relay 230, as previously described, and operate PA relay 350 from ground through operated contacts 225 and 244, normally closed contacts 232, X off-normal contacts X23, normally closed contacts 314, and through the winding of PA relay 350 to battery. Operation of PA relay 350 energizes PB relay 310 by connecting their coil windings in series when the shunting ground preventing PB relay 310 from operating is opened, at contacts 232, by the subsequent reoperation of X delay relay 230. At that time, PB relay 310 is energized from ground through operated contacts 225, the upper winding of PB relay 310, normally closed contacts 316, operated contacts 353, and through the winding of PA relay 350 to battery. PB relay 310 locks itself by closing contacts 317 as contacts 316 open and transfers the operating circuit for PA relay 350 to operated contacts 315 and then open contacts 333, thus restoring the PA relay 350. Operation of PB relay 310 also opens the releasing circuit for release magnet ZM21 at contacts 313 so no subsequent release action of the switch will occur while the subsequent two subscriber digits such as "34" are being pulsed. Operation of PB relay 310 also opens the optional wiring 42 and 43 at contacts 311 and 312 and the CB relay 210 is now connected to the T and R conductors through operated contacts 241 and 242 and normally closed contacts 251 and 253.

The remaining subscriber call digits such as, for example, "34" may now be pulsed, by operator 21 or testing position 22, in a similar manner as the group selecting digit "1." The brushes T2, R2 and S2 will now be advanced three steps in the X direction and X delay relay 230 will restore after the digit has been completed. The four Y direction pulses may now be forwarded in a similar manner. Release delay relay 220 will remain operated during the pulsing cycle, as described previously. Calling bridge relay 210 will again respond to the pulses, and each time the calling bridge relay 210 restores, Y magnet YM31 will step the brushes T2, R2 and S2 one step across the Y bank level. The pulsing path is from ground momentarily through contacts 212, operated contacts 226, normally closed contacts 234, operated contacts 345 and 318, and through both Y magnet YM31 and lower winding of Y delay relay 340 to battery.

As the switch brushes move in the Y direction, the holding ground for the upper winding of Y delay relay 340 is opened at the normally closed contacts of the Y off-normal springs Y31 so that, when the intermittent ground pulses are completed, Y delay relay 340 will restore to open the pulsing circuit at contacts 345. Restoration of Y delay relay 340 connects the T2 brush 51 through normally closed contacts 341 and 321, and through capacitor C21 to the incoming conductor T. Restoration of Y delay relay 340 also connects the R2 switch brush 52 through normally closed contacts 342 and 323, and through capacitor C22 to the incoming conductor R. Restoration of the Y delay relay 340 also connects the S2 brush 53, through normally closed contacts 351 and 343, to line busy relay 250 which will operate if a busy line is encountered. Operation of the line busy relay 250 reverses the incoming conductors T and R, at contacts 251, 252 and 253, 254, so that a busy line indication is given to the operator 21 or to the testing position 22. This busy line indication is used primarily for verification purposes. The operator 21 or testing position 22 may now monitor the called subscriber line "134" to determine if conversation is taking place.

If the operator at the testing position 22 decides that line testing may proceed, ground is momentarily connected to test lead 41 to operate loop test relay 330, from ground on lead 41, operated contacts 224, normally closed contacts 255 and 325, and through winding of loop test relay 330 to battery. Operation of loop test relay 330 energizes PA relay 350, from ground through operated contacts 225, normally closed contacts 327, operated contacts 333 and 315, and through winding of PA relay 350 to battery. When loop test relay 330 is restored by removal of ground on the test lead 41 by testing position 22, the PC relay 320 operates in series with the PA relay 350 from battery through PA relay 350, operated contacts 353, normally closed contacts 344, and through the winding of PC relay 320, Y off-normal springs Y31 to ground through operated contacts 225.

Operation of PA relay 350 opens the operating circuit for line busy relay 250 from S2 brush 53, and connects ground through operated contacts 352 to operate the cutoff relay in the station line circuit in the well known manner. Operation of PC relay 320 opens the circuit of the T2 brush 51 from the capacitor C21 and the incoming line conductor T, and connects it through contacts 322, normally closed contacts 331, operated contacts 326, normally closed contacts 255 and operated contacts 224, to the test lead 41 for subsequent line insulation tests. The circuit of the R2 brush 52 is also opened from the capacitor C22 and the incoming conductor R, and is connected through contacts 324 to the same testing circuit over test lead 41. Subscriber line conductors T2 and R2 are thusly connected together and may be tested, for ground and battery insulation faults, from testing position 22, as desired.

If the operator at the testing position 22 desires to test the called line 134, for example, for insulation leakage between the conductors T2 and R2, the digit "1" is dialed to momentarily restore calling bridge relay 210. This momentary single pulse operates the loop test relay 330, from ground through contacts 212, operated contacts 226, normally closed contacts 234 and 346, operated contacts 329, and through the winding of loop test relay 330 to battery. Relay 330 locks itself through operated contacts 334, 328 and 225 to ground. Loop insulation tests may now be made from the testing position 22, through test lead 41, operated contacts 224, normally closed contacts 255, operated contacts 326 and 324, normally closed contacts 342, R2 brush 52, across subscriber line conductors, T2 brush 51, normally closed contacts 341 and operated contacts 322 and 332 to ground.

When the required verification and insulation tests have been completed, the operator 21 or the operator at the testing position 22 abandons the call in the well known manner and calling bridge relay 210 restores. Holding ground for release delay relay 220 is opened, at contacts 211, to restore it after its time delay period has elapsed. Restoration of this relay 220 opens the guarding ground for incoming conductor S at contacts 221. Restoration of the test switch follows, by means of common release ground through contacts 222 and X off-normal contacts S21 in multiple with Y off-normal contacts Y21, and through release magnet Z21 to battery.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What is claimed is:

1. A telephone network including a plurality of groups of lines, connecting means for each group of lines, an input circuit for each connecting means, circuit means for connecting the input circuits of all of the connecting means in multiple, means controllable over said input circuits for causing only a predetermined one of said connecting means to operate, and means responsive to the operation of said predetermined connecting means for selecting one of said connecting means to thereafter be controllable over said input circuits to be operated to connect with a line in the group of lines available to the selected connecting means.

2. A telephone line testing system for a telephone network including a testing position and a plurality of groups of lines to be tested, connecting means for each group of lines, an input circuit for each connecting means, circuit means for connecting the input circuits of all of the connecting means in multiple to the testing position, means controllable over said input circuits for causing only a predetermined one of said connecting means to operate, and means responsive to the operation of said predetermined connecting means for selecting one of said connecting means to thereafter be controllable over said input circuits to be operated to connect with a line to be tested in the group of lines available to the selected connecting means.

3. A telephone system having a plurality of groups of lines, a group connecting switch for each group of lines, each of said switches having an input circuit, means connecting the input circuits of all of the group switches in multiple, means controllable over said input circuits to cause only a predetermined one of said switches to move to an off-normal position and then return to normal, and means responsive to the aforesaid off-normal positioning of said predetermined switch to select one of said switches to thereafter move to connect with a line in the group of lines available to the selected switch.

4. A telephone line testing system for a telephone network including a testing position and a plurality of groups of lines to be tested, a group test connecting switch for each group of lines, each of said switches having an input circuit, means connecting the input circuits of all of the group switches in multiple to the testing position, means controllable over said input circuits to cause only a predetermined one of said switches to move to an off-normal position and then return to normal, and means responsive to the aforesaid off-normal positioning of said predetermined switch to select one of said switches to thereafter move to connect with a line to be tested in the group of lines available to the selected switch.

5. A telephone network including a central office and a remotely controlled dial office having a plurality of groups of lines, a group connecting switch for each group of lines and movable in first and second directions, an input circuit for each switch, means connecting the input circuits of all of the switches in multiple to the central office, means controllable over said input circuits to cause only a predetermined one of said switches to move to an off-normal position in a first direction and then return to normal, and means responsive to the aforesaid off-normal positioning in the first direction of said predetermined switch to select one of said switches to be controllable over said input circuits to move off-normal in first and second directions and thereby connect with a line in the group of lines available to the selected switch.

6. A telephone line testing system for a telephone network including a central testing position and a remotely controlled dial office having a plurality of groups of lines to be tested, a group test connecting switch for each group of lines and movable in first and second directions, an input circuit for each switch, means connecting the input circuits of all of the switches in multiple to the testing position, means controllable over said input circuits to cause only a predetermined one of said switches to move to an off-normal position in a first direction and then return to normal, and means responsive to the aforesaid off-normal positioning in the first direction of said predetermined switch to select one of said switches to be controllable over said input circuits to move off-normal in first and second directions and thereby connect with a line to be tested in the group of lines available to the selected switch.

7. A telephone line testing system for a telephone network including a central testing position and a remotely controlled dial office having a plurality of groups of lines to be tested, an impulse responsive group test connecting switch for each group of lines and movable in first and second directions, an input circuit for each switch, means connecting the input circuits of all of the switches in multiple to the testing position, means controllable from the testing position over said input circuits to cause only a predetermined one of said switches to move momentarily to an off-normal position in a first direction in response to the impulses of a first digit and then return to normal, and means responsive to the momentary off-normal positioning in the first direction of said predetermined switch to select one of said switches to be controllable over said input circuits to move off-normal in first and second directions in response to the impulses of the next two successive digits and thereby connect with a line to be tested in the group of lines available to the selected switch.

8. A telephone line testing system for a telephone network including a central testing position and a plurality of remotely controlled dial offices, each office having a plurality of groups of lines to be tested, an impulse responsive group test connecting switch in each office for each group of lines and movable in first and second directions, an input circuit for each switch, means connecting the input circuits of all of the switches in each office in multiple, means controllable from the testing position to select one of said multipled input circuits to a predetermined office, means controllable over the selected multipled input circuit to cause only a predetermined one of said switches in the selected office to move momentarily to an off-normal position in a first direction in response to the impulses of a first digit and then return to normal, and means responsive to the momentary off-normal positioning in the first direction of said predetermined switch to select one of said switches in the selected office to be controllable over said multipled input circuits to move off-normal in first and second directions in response to the impulses of the next two successive digits and thereby connect with a line to be tested in the group of lines available to the selected switch in the predetermined office.

References Cited in the file of this patent

UNITED STATES PATENTS 2,564,013 Kessler ---------------- Aug. 14, 1951
2,623,956 Metal ------------------ Dec. 30, 1952